Sept. 20, 1966 J. A. SWANSON 3,274,572

MEMORY SYSTEM

Filed March 26, 1963 2 Sheets-Sheet 1

JOHN A. SWANSON
INVENTOR.

BY Samuel Lindenberg

ATTORNEY

Sept. 20, 1966 J. A. SWANSON 3,274,572

MEMORY SYSTEM

Filed March 26, 1963 2 Sheets-Sheet 2

INVENTOR.
JOHN A. SWANSON
BY Samuel Lindenberg
ATTORNEY

United States Patent Office 3,274,572
Patented Sept. 20, 1966

3,274,572
MEMORY SYSTEM

John A. Swanson, Mountain View, Calif., assignor to AMP Incorporated, Harrisburg, Pa.

Filed Mar. 26, 1963, Ser. No. 268,123
5 Claims. (Cl. 340—174)

This invention relates to systems for storing data in magnetic cores and more particularly to improvements therein.

The use of a magnetic core shift register as a temporary storage device for data in computers is quite widespread. However, when it is desired to store a large number of words, instead of using a large number of shift registers, the form which the magnetic core storage system takes is quite different. These are a number of reasons for this, principle amongst which is the ease of addressing, for example, coincident current techniques for both write in and read out. However, where it is desired to continuously scan the contents of the memory, since shift registers may be made to operate by continuously circulating their contents, whereas core memories are not normally operated in this made and require restoration of their contents when read out, it would appear that were it not for the problem of simply and easily entering data into one of a plurality of shift registers, for certain operations, such as the type described, a magnetic core memory made of a plurality of shift registers would be quite advantageous.

Accordingly, an object of this invention is the provision of an easily addressable memory system comprised of a plurality of shift registers.

Yet another object of the present invention is the provision of a novel system for entering data into a predetermined one of a plurality of shift registers.

Yet another object of the present invention is the provision of a novel, useful and unique memory system employing a plurality of shift registers.

These and other objects of this invention may be achieved in an arrangement wherein a plurality of magnetic core shift registers are employed for storing data. A word contains two parts. The first part of the word is the address of a shift register into which the second part of the word containing the data is to be stored. A decoding tree circuit in response to the address portion of the word, applies a signal to one of a plurality of write gates which are associated with a different one of a plurality of shift registers. The data portion of the word can then be entered into the predetermined one of the shift registers through this write gate replacing the data previously in the shift register.

Figure 1:
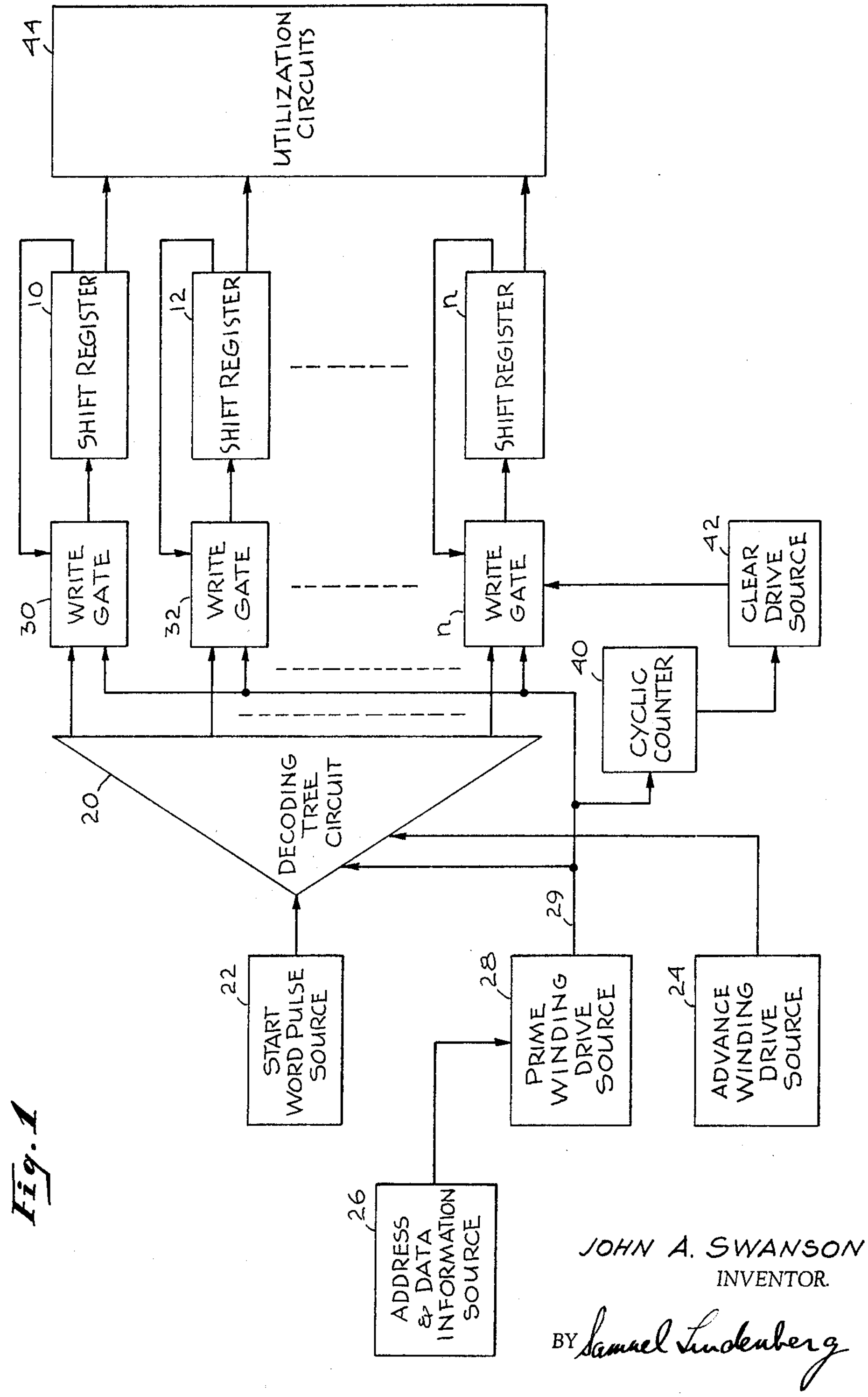
Figure 2:
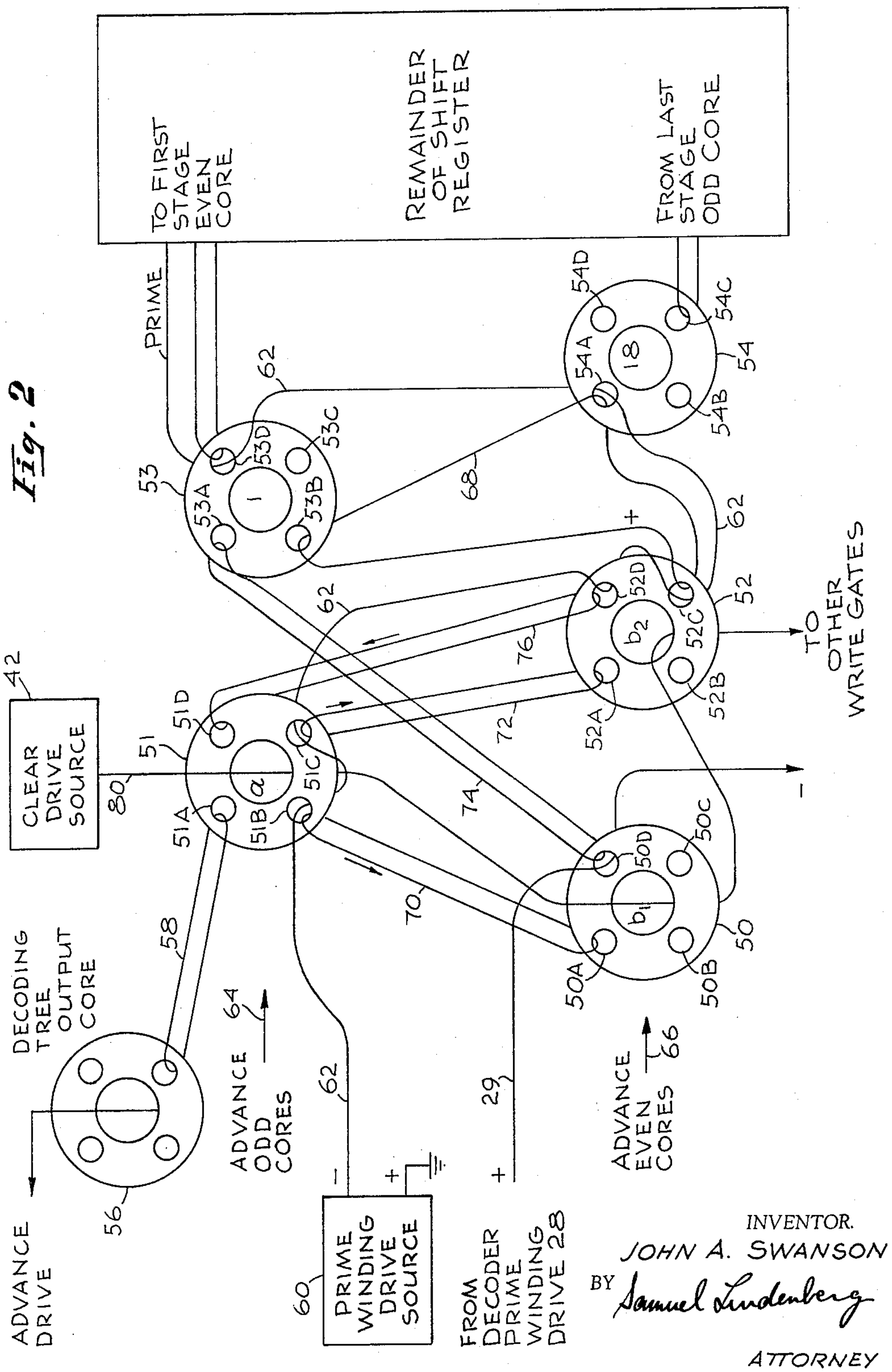

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a block diagram of a memory system employing a plurality of shift registers in accordance with this invention, and FIGURE 2 is a schematic diagram of a magnetic gate circuit in accordance with this invention.

Referring now to FIGURE 1, there may be seen a block schematic diagram of an arrangement in accordance with this invention for employing a plurality of shift registers as a memory storage system. In Patent No. 3,081,453, for a Magnetic Core De-Coding Circuit by Nitzan, there is described a magnetic core decoding tree arrangement comprising a plurality of multiaperture cores. The input to the decoding tree is through a single magnetic cores. The output comprises a plurality of magnetic cores. The input magnetic core is driven to its set state. The set state of this core is transmitted through the decoding tree circuit arrangement into one of the plurality of output magnetic cores. The one of the plurality of output magnetic cores to which the set state is translated, is determined by an address thereof. Priming windings, which are selectively coupled to the respective minor output apertures of the multiaperture cores of the decoding tree, are energized in accordance with the address data. Thus the transfer of the set state of the magnetic core through the decoding tree circuit is determined by prime winding excitations, whereby only the one of the plurality of output magnetic cores having the address corresponding to the prime winding controlling address, is driven to its set state.

In accordance with this invention a word of data comprises two portions. The first portion consists of a number of binary bits which represent the address of one of a plurality of shift registers, 10, 12, . . . *n*, shown in FIGURE 1 into which it is desired that the second portion of the word consisting of the data be transferred. A decoding tree circuit 20, of the type described and claimed in the Nitzan Patent 3,081,453, is employed. Associated with the decoding tree circuit 20, is a start word pulse source 22, an advance winding drive circuit 24, and an address and data information source 26, which drives the prime winding drive source 28.

When it is desired to enter data into one of the shift registers 10, 12 . . . *n*, a single pulse from the start word pulse source 22, is used to drive a first core in the decoding tree circuit 20, into its set state. Thereafter, the binary bits representing an address of a register into which it is desired to enter the binary bits representing the word of information which follows the address, are applied to control the prime winding drive applied from the prime winding drive source 28. The sequencing of the decoding tree circuit effectively comprises priming one or the other of two output minor apertures of a previously set magnetic core in the decoding tree whereby, upon a clear drive being applied to that core, an output will be induced in the output winding coupled to the primed one of the two minor apertures which can accordingly set the core to which that output winding is coupled.

The advance winding drive circuit 24, serves to provide clearing current to the clearing windings in the decoding tree circuit.

The last advance winding drive from the circuit 24, which is applied to the plurality of output cores of the decoding tree circuit, will apply an output to the one of a plurality of write gates respectively 30, 32 . . . *n* which is associated with the one of a plurality of shift registers which has been addressed. This write gate is then made responsive to the priming winding drive signals which are received from the priming winding drive source 28. These signals now convey the information in the second part of a word, namely the data portion, which it is desired to enter into a shift register. The write gate which has been selected now prevents the shift register from circulating its contents, entering thereinto instead the data represented by the current pulses from the prime winding drive source. A cyclic counter 40 is employed to count a number of binary bits of a word and after the last bit has been entered into the selected shift register, in a manner to be described herein, the cyclic counter is enabled to energize a clear drive source 42. This drive source clears the write gate which has been opened so that it is in condition to receive a new and incoming data word. When any of the write gates are not open, the shift registers operate in the usual manner to circulate their contents whereby utilization circuits 44, which are connected to the shift register outputs may scan the contents of the shift registers to use the information contained therein in any manner desired.

Reference is now made to FIGURE 2 which is a circuit diagram of the magnetic core arrangement for one of the write gates, illustrating how a write gate is opened in response to a drive received from one of the output cores of the decoding tree circuit thereafter open the circulation path of a shift register for entering into the shift register the data represented by the current pulses received from the prime winding of the decoding tree circuit. Each one of the magnetic cores shown in FIGURE 2 is of the multiaperture type and preferably has substantially rectangular hysteresis characteristics. The write gate includes three multiaperture magnetic cores respectively 50, 51, 52. The shift register with which each gate is employed is of the well known type which comprises a plurality of successive stages, each of which includes two cores, one of which is designated as the odd core of the state and the other of which is designated as the even core of the stage. The advance of data serially through a shift register occurs in response to a two clock pulse source wherein, first of all of the odd cores in the shift register are cleared, whereby the data contained therein is transferred to the even cores, and then all of the even cores are cleared, whereby the data is transferred to the succeeding odd cores.

The gate cores 50, 51, and 52 are coupled, in a manner to be described, to a multiaperture core 53, which is the odd core in the first stage of the shift register, and to a multiaperture core 54, which is the even core in the last state of the shift register.

A magnetic core 56, which constitutes an output core of the decoding tree circuit 20, to which a pulse may be transferred from the input, is coupled by means of an input winding 58 to an input minor aperture 51A of the magnetic core 51. When the core 56 is cleared by an advance drive applied thereto, its output over transfer winding 58 drives the magnetic core 51 to its set state of magnetic remanence. A prime winding drive source 60, provides a prime winding current for both the gate cores as well as for the cores of the shift register. The prime winding drive source applies current to a priming winding 62. This winding is inductively coupled to the minor apertures 51B and 51C of core 51, to minor apertures 52D and 52C of core 52, to minor aperture 54A of core 54, to minor aperture 53D of core 54, and thereafter threads through the output minor apertures of the remaining magnetic cores in the shift register, in a manner which is well known to those skilled in the art.

There is also provided both an advance odd core winding 64 and an advance even core winding 66. These are shown in fragmentary form. The reason is that the advance odd and advance even windings respectively thread through the main apertures of all of the odd cores of both the gate and the shift registers and all of the even cores of both the gate and the shift register in a well known fashion. To show these windings in FIGURE 2 would serve the purpose of complicating the drawing without clarifying either the description or an understanding thereof. These windings are alternately excited from a two phase clock source to alternately clear the odd cores thereby transferring their contents into the subsequent even cores and then to clear these even cores to thereby transfer their contents into the subsequent odd cores.

It should be noted at this time that core 54 which is the last stage even core of the shift register is inductively coupled by a transfer winding 68 to the first stage odd core 53, so that except for the intervention effectuated by the gate cores, the contents of the shift register are circulated from the last stage to the first stage.

The magnetic core 51 has two output transfer windings respectively 70, 72. One of these couples the minor aperture 51B to the minor aperture 50A of core 50. Winding 72 couples the minor aperture 51C to the minor aperture 52A of the core 52. When magnetic core 51 is set, the prime winding drive source 60 then can prime the magnetic material surrounding the respective apertures 51B and 51C, whereby in response to an advance odd drive by the winding 64 magnetic core 50 may be driven to its set state as well as magnetic core 52. Magnetic core 52 then has the magnetic materials surrounding the output apertures 52D and 52C primed by the current flowing in the prime winding 62. However, whether or not the magnetic material which surrounds the aperture 50D of core 50 is primed, depends upon whether a prime drive is received over the prime winding 29 which is driven from the prime winding drive source 28.

It should be recalled that at the termination of the address portion of a word the data portion commences. Therefore, since the presence or absence of current on the prime winding, or the presence of current of the proper polarity for priming the core 50 depends upon the data, then, whether or not core 50 is primed at this time depends upon whether there is a zero or a one binary bit present in the data word. If there is a zero binary bit then magnetic core 50 is not primed. If there is a one binary bit present then the core is primed. Assume first that the magnetic core 50 is not primed. Then upon the application of an advance even core current drive by means of the winding 66 magnetic cores 50, 52, and 54 will be cleared.

The winding 68, is inductively coupled to the output apertures 52C and 54A with an opposing winding sense whereby should both of these cores have been in their prime states then upon the occurrence of the advance even core drive the voltages induced in these windings from cores 52 and 54 will oppose each other and cancel. The sense of the coupling of the winding 68 through the aperture 53B is such that should core 52 have been primed and not core 54, upon the occurrence of the advance even core drive, then although there is a voltage induced in the winding 68 by the clear drive to core 52, this would not set core 53, since the magnetomotive force applied as a result by current induced in the winding 68, tends to drive the core 53 further into its clear state of magnetic remanence. However, should core 54 have been primed and not core 52 at the time of the application of the advance even core drive, then the sense of the coupling of the winding 68 is such that core 53 will be driven to its set state in response to the voltage induced in this winding from core 54. Stated more simply, the arrangement of the transfer winding 68 on cores 52, 54, and 53, is such that core 53 is left relatively unaffected when cores 52 and 54 are both primed, is left relatively unaffected when only core 52 is primed, and is driven into its set state should core 54 only have been primed.

From the foregoing description it will be seen that core 52 effectively serves the purpose of opening up the closed loop of the register output to the register input. This enables the output from core 50 to be entered into the register. The aperture 50D of core 50, which is its output aperture, is coupled to an input aperture 53A of core 53 by a transfer winding 74. Accordingly, upon the application of an advance even core drive to the cores 50, 52, and 54, then the output of core 54 is prevented from being entered therein into the core 53 and the output of core 50 is inserted therein instead. Should core 50 have not been primed (representative of a zero binary bit) then core 53 will store a zero binary bit. Should core 50 have been primed (representative of a one binary bit) then core 53 is driven to its set state and thereafter primed. Core 53 is then storing a one.

Core 52 has a second output winding 76, which couples the output aperture 52B to the input aperture 51D on core 51. The function of this transfer winding 76 is to return core 51 to its set state when core 52 is driven to its clear state. As a result, upon the occurrence of the next advance odd core drive, the one bit now stored in core 51 is transferred into core 52, over the transfer winding 72, and the bit stored in core 53 is shifted to the first stage even core of the shift register, thus clearing core 53 to receive the next input from core 50 upon its being driven in response to the advance even core drive. At the same time that core 51 drives core 52 to the set state over windings 72, it also drives core 50 to the set state over winding 70. Whether or not, in response to the succeeding advance even core drive, core 53 is driven from core 50 depends upon the information represented by the prime winding current on the prime winding 29 at this time.

To summarize the operations described above, cores 51 and 52 operate as a flip-flop circuit to store the set state of core 51, when it occurs, for the purpose of blocking circulation of data in the shift register from the last core to the first core. The information which is written into the first core of the shift register is a function of the prime winding drive current which is applied to the core 50. Entry of the last binary bit of a data word into the shift register, is sensed and the clear drive source 42, applies a clear drive to a winding 80 which extends through all the cores 51, 50, 52, of all of the gates, and drives them to their clear states. As a result, any output from the magnetic core 54, which is the last core of the shift register, can then be entered into the first core of the shift register and the circulating loop is thereby closed.

From the foregoing description it can be seen how the address of a data word can simply select a one of a plurality of registers to which that word is to be written. A gate interposed between the selecting network and the input to the register is enabled, whereby the circulating loop of the register is opened and the data is entered into the register through the gate. At the termination of a word the gate is closed.

Accordingly, there has been described herein a novel, useful and simple arrangement for a shift register memory system whereby data may be entered into a predetermined one of said shift registers.

I claim:

1. In a system for storing data in a shift register having a first and last stage wherein there is a first magnetic core having at least two input minor apertures, and a last magnetic core having at least one output minor aperture, a system for gating information into said register comprising a first, second and third magnetic core, winding means coupling said third magnetic core with said last and first shift register cores for enabling an input to said first shift register core only in the absence of an output from said third core, means coupling said first and second and first and third cores for transferring an output from said first core to said respective second and third cores, transfer winding means for applying output from said second core to said first core of said shift register, means for conditioning said second core after receiving an input from said first core in accordance with data desired to be entered into the first core of said shift register, and means for simultaneously applying a drive to said second core, said third core and the last core of said shift register, for entering data in accordance with the condition of said second core into the first core of said shift register, for preventing the entry of data from said last core of said shift register, into said first core of said shift register, and for applying an output from said third core to said first core.

2. A memory system comprising a plurality of shift registers, each of which has a last stage including a last magnetic core and a first stage including a first magnetic core, a plurality of writing gates a different one of which is associated with a different one of said shift registers, means for selecting for data entry a predetermined one of said plurality of gates, means coupling each gate in the data flow path between said shift register last core and said shift register first core for blocking data flow therebetween when said gate is selected for data entry into said register, and means for entering data into said first core of said shift register including a data entry magnetic core having substantially rectangular hysteresis characteristics and a clear state, a set state, and a prime state of magnetic remanence, means for driving said data entry magnetic core into its set state each time it is desired to enter data into said shift register, means for driving said data entry magnetic core to its prime state responsive to data desired to be entered into said register, and means for driving said data entry core to its clear state to enter the data in said data entry magnetic core into said first magnetic core of said shift register.

3. The combination with a magnetic core register of the type having a first stage and a first magnetic core therein and a last stage with a last magnetic core therein of a magnetic core gate for entering data into said shift register comprising first, second and third magnetic core means, each having a clear and set state of magnetic remanence means for driving said first magnetic core means into its set state of magnetic remanence when it is desired to enter data into said register, means for applying a drive to said first magnetic core means to drive it to its clear state of magnetic remanence, means coupling said second and third magnetic core means to said first magnetic core means for driving said second and third magnetic core means to their set states of magnetic remanence responsive to the clear drive applied to said first magnetic core means, winding means coupling said last stage core of said shift register, said first stage core of said shift register, and the third magnetic core means of said gate for preventing data transfer between said first and last magnetic cores of said shift register when said third magnetic core means is in its set state of magnetic remanence, and winding means coupling said second magnetic core means to said first core of said shift register for transferring data thereinto when said second magnetic core means has been driven to its set state of magnetic remanence.

4. The system as recited in claim 3 wherein said second magnetic core means includes a multi aperture core, a priming winding coupled to said magnetic core through one of its apertures, said winding means coupling said second magnetic core means to said first magnetic core of said shift register comprises a winding wound on said first magnetic core and passing through one of the apertures of said second magnetic core means through which said priming winding passes, means for applying a current pulse to said priming winding for driving said second magnetic core means to its prime state of magnetic remanence, and winding means for driving said second magnetic core means to its clear state for thereby transferring data from said second magnetic core to said first magnetic core.

5. A magnetic core gating system for a magnetic core shift register of the type having a first stage with a first magnetic core and a last stage with a last magnetic core comprising first, second and third magnetic cores each having two states of magnetic remanence and a plurality of apertures therein, means for driving said first core to its set state of magnetic remanence, a first transfer winding wound through a first of said first core apertures and a first aperture on said second core, a second transfer winding wound through a second of said first core apertures and a first aperture of said third core, a third transfer winding wound through a second aperture of said third core and a third aperture on said first core, a fourth transfer winding wound through a second aperture on said second core and a first aperture on said first core of said register, transfer winding means wound through a first aperture of the last core of said magnetic register a second aperture of said first core of said magnetic register and a third aperture of said third core of said gate for preventing a transfer between said last and first cores of said register in the presence of an output from said third gate core, a priming winding extending through the first and second apertures of said first gate core, the second and third apertures of said third gate core, and the first aperture of said last register core, means for driving said first gate core to its set state when it is desired to enter data into said register, means for driving said first gate core to its clear state to drive said second and third gate cores to their set states through said first and second transfer windings, means for priming said second gate core in accordance with the data desired to be entered into said register, and means for applying a clearing drive to said second and third gate cores and to said last shift register core for entering data into said first shift register core through said fourth transfer winding, for driving said first gate core to its set state through said third transfer winding, and for preventing the entry of data from said last shift register core into said first shift register core.

References Cited by the Examiner

UNITED STATES PATENTS

| | | | |
|---|---|---|---|
| 3,150,354 | 9/1964 | English | 340—174 |
| 3,207,912 | 9/1965 | Mallinson | 340—174 |
| 3,211,916 | 10/1965 | Sweeney | 307—88 |

BERNARD KONICK, *Primary Examiner.*

S. URYNOWICZ, *Assistant Examiner.*